United States Patent [19]

Reeb et al.

[11] Patent Number: 4,663,411

[45] Date of Patent: May 5, 1987

[54] CROSSLINKABLE POLYMERS BASED ON UNSATURATED ESTERS OF FUROIC ACID AND PROCESS FOR THEIR PREPARATION AND APPLICATION IN THE MANUFACTURE OF COATINGS

[75] Inventors: Roland Reeb, Claye Souilly; Bernard Chauvel, Ermont, both of France

[73] Assignee: Rhone Poulenc Specialities Chimiques, Courbevoie, France

[21] Appl. No.: 820,218

[22] Filed: Jan. 21, 1986

[30] Foreign Application Priority Data

Jan. 25, 1985 [FR] France ................................ 85 01040

[51] Int. Cl.$^4$ ............................................. C08F 20/26
[52] U.S. Cl. .................................... 526/270; 524/549
[58] Field of Search ............... 526/270; 524/549, 811; 428/402

[56] References Cited

U.S. PATENT DOCUMENTS 2,195,382  3/1940  Slagh ................................... 526/270
3,600,290  8/1971  Fitko ............................. 204/159.22
4,497,929  2/1985  Brown et al. ....................... 526/270

FOREIGN PATENT DOCUMENTS 467900   6/1937  United Kingdom .
2019398 10/1979  United Kingdom .

OTHER PUBLICATIONS

Gandini, The Behaviour of Furan Derivatives in Polymerization Reactions.

*Primary Examiner*—Paul R. Michl
*Attorney, Agent, or Firm*—Finnegan, Henderson, Farabow, Garrett & Dunner

[57] ABSTRACT

Crosslinkable polymers having about 1 to 100% of units derived from an unsaturated ester of furoic acid of the formula:

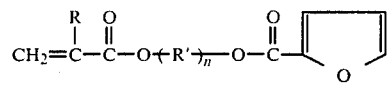

where R denotes hydrogen or an alkyl group, R' denotes a straight-chain or branched alkylene group and n denotes an integer from 1 to 4, and 0 to about 99% of units from an unsaturated monomer which is copolymerizable with the ester. The crosslinkable polymers may be in the form of latices. The crosslinkable polymers are prepared by polymerization of the unsaturated ester of furoic acid and, if appropriate, an unsaturated comonomer, in aqueous emulsion. The polymers and latices can be used in the manufacture of coatings.

21 Claims, No Drawings

CROSSLINKABLE POLYMERS BASED ON UNSATURATED ESTERS OF FUROIC ACID AND PROCESS FOR THEIR PREPARATION AND APPLICATION IN THE MANUFACTURE OF COATINGS

The present invention relates to polymers and copolymers crosslinkable even when cold, of unsaturated esters of furoic acid, particularly alkylfuroate acrylates and alkylacrylates, and latices of these polymers or copolymers and a process for preparing the polymers and application of the polymers as binders or in the manufacture of coatings.

The crosslinkable polymers and copolymers which are the subject of the invention comprise:

about 1 to 100% of units derived from an unsaturated ester of furoic acid having the formula:

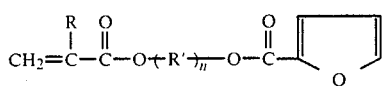

wherein:
R denotes hydrogen or an alkyl group, preferably a $C_1$–$C_2$ alkyl group and more preferably a $C_1$ alkyl group;
R' denotes a straight-chain or branched alkylene group, preferably a $C_1$–$C_5$ alkylene group and more preferably a $C_2$–$C_4$ alkylene group; and
n denotes an integer from 1 to 4, preferably 1,
and 0 to about 99% of units derived from at least one unsaturated monomer which is copolymerizable with the unsaturated ester of formula I.

The crosslinkable copolymers preferably consist of:
about 1 to 50% of units derived from an unsaturated ester of furoic acid of formula (I); and
about 50 to 99% of units derived from at least one unsaturated monomer which is copolymerizable with the unsaturated ester of formula (I).

As defined herein, the term "polymers" refers both to homopolymers of the unsaturated esters of formula I, and to copolymers of such esters.

As defined herein, the term "crosslinkable polymers" refers to "polymers" which are not yet crosslinked or which are already partly spontaneously crosslinked during polymerization.

Representative unsaturated esters of formula I, include 2-ethylfuroyl acrylate and methacrylate, and isopropylfuroyl acrylates and methacrylates.

Unsaturated esters of formula (I) can be obtained for example, by reaction of a hydroxyalkyl acrylate, or alkylacrylate, preferably acrylate or ethylacrylate, of the formula (II):

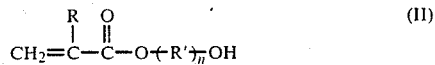

where R, R' and n have the meaning given above, with a furoyl halide. The quantities of reactants employed preferably correspond to a furoyl halide/reactant of formula (II) molar ratio ranging from about stoichiometry to about a 10% excess of either of the reactants, relative to stoichiometry.

Representative reactant of formula (II) include 2-hydroxethyl, 2-hydroxypropyl, 2-hydroxy-1-methylethyl, 3-hydroxypropyl, 2-hydroxy-1-ethylethyl and 4-hydroxybutyl acrylates or methacrylates.

Furoyl bromide, and especially furoyl chloride, are illustrative furoyl halides.

Preferably the reaction is carried out at a temperature of from about 0° to 40° C., more preferably from 5° to 20° C., in the presence of a catalyst which traps the hydrogen halide formed and a solvent for both the furoyl halide and the reactant of formula II.

Representative catalysts include tertiary amines which do not contain labile hydrogen, such as trialkylamines containing $C_1$–$C_6$ alkyl radicals, N,N-dialkylanilines containing $C_1$–$C_2$ alkyl radicals, tertiary alkylene polyamines (triethylenediamine, N,N,N',N'-tetramethylethylenediamine, N,N,N', N'-tetramethyl-1, 3-butanediamine, etc), and aromatic tertiary amines, such as pyridine and methylpyridine.

The quantity of catalyst preferably employed corresponds to a molar ratio of catalyst to the hydrogen halide formed ranging from about stoichiometry to about a 10% excess relative to stoichiometry.

Illustrative solvents include pyridine, aromatic solvents (benzene, toluene and xylene), and chlorinated aliphatic solvents (dichloromethane, chloroform, carbon tetrachloride, and 1,2-dichloroethane.) The solvents are employed in a quantity sufficient at least to dissolve the reactants.

Pyridine, which functions both as a catalyst and as a solvent, is especially preferred. The reaction preferably takes place in about one or two hours.

After reaction, the catalyst and solvent are separated from the desired ester, by, for example, acidifying the reaction mixture when cold with an inorganic acid such as hydrochloric acid, sulfuric acid, and perchloric acid. The acidification can be carried out at a temperature of about 0° C., with an excess of acid relative to the quantity of unreacted catalyst. The excess acid may range up to about 100% relative to stoichiometry.

The desired ester is isolated, for example, by liquid/liquid phase separation, and is purified, for example, by washing with water.

Representative unsaturated monomers which are copolymerizable with the unsaturated esters of formula I, include:

conjugated dienes such as butadiene, isoprene, chloroprene, 1,3-pentadiene and dimethylbutadiene;

acrylic or methacrylic monomers such as acrylonitrile, methacrylonitrile and methyl, ethyl, propyl, isopropyl, butyl, 2-ethylhexyl, hydroxyethyl, hydroxypropyl or glycidyl acrylates or methacrylates;

vinyl or vinylidene halides sucoh as vinyl chloride or vinylidene chloride;

vinyl aromatic monomers such as styrene, α-methylstyrene, vinylstyrene, monochlorostyrene;

vinyl esters of carboxylic acids, such as vinyl acetate, vinyl propionate, vinyl versatate, vinyl butyrate;

mono- or dicarboxylic acids containing one or more ethylenic unsaturations, such as acrylic, methacrylic, crotonic, maleic, fumaric and itaconic acids; and alkali metal salts of unsaturated sulfonic acids such as sodium vinyl sulfonate.

The crosslinkable polymers of the present invention preferably have a number-average molecular weight of from about 10,000 to 300,000, more preferably from about 50,000 to 200,000.

The crosslinkable polymers have a low glass transition temperature Tg, which is generally below ambient temperature.

The polymers of the present invention can crosslink spontaneously at ambient temperature in the presence of atmospheric oxygen.

Spontaneous crosslinking can be accelerated or increased by heat treatment, by promoting reaction with free radicals produced, for example, by peroxide initiators (optionally in the presence of driers), azo initiators, or by a photochemical reaction under, for example, ultraviolet light. The crosslinked polymers preferably have a gel content of from about 70% to 100% and a swelling index of from about 0 to 30. Methods of measuring these properties are described in the examples below.

The crosslinkable polymers can be obtained, for example, by any polymerization technique, such as suspension or emulsion polymerization.

The crosslinkable polymers can be obtained by solution polymerization of a monomer composition comprising:

about 1 to 100% of the unsaturated ester of furoic acid of formula (I); and 0 to about 99% of at least one unsaturated monomer which is copolymerizable with the ester of formula (I) in a solvent for the required polymer, in the presence of an initiator which is compatible with the solvent and, optionally, a chain-transfer agent.

A preferred copolymer can be prepared from:

about 1 to 50% of the unsaturated ester of furoic acid of formula (I) and about 50 to 99% of at least one unsaturated monomer which is copolymerizable with the ester of formula (I).

The unsaturated ester of formula I and representative optional monomer(s) which can be employed are set forth above. The unsaturated ester and monomer(s) can be added to the reaction medium, either in a single quantity before the polymerization begins or in successive portions or continuously during the polymerization. It is not necessary for the monomer composition to be uniform in nature while the unsaturated ester and monomer(s) are added portionwise or continuously to the reaction mixture.

Illustrative solvents include acetone, methylethyl ketone and methylisobutyl ketone, aromatic solvents such as benzene, toluene and xylene, aliphatic or alicyclic solvents such as hexane, chloroform, dichloromethane, carbon tetrachloride, dichloroethane, cyclohexane and methylcyclohexane, tetrahydrofuran, and dimethylformamide.

The choice of the solvent depends on the required polymer. Aromatic solvents, chlorinated solvents and tetrahydrofuran are preferred to obtain a polymer in which more than approximately 50% of the units are derived from an unsaturated monomer which is copolymerizable with the ester of formula I.

The quantity of solvent preferably employed is such that the concentration of the monomer composition in the solvent is from about 0.5 to 75% by weight, and more preferably from 25 to 50% by weight.

Initiators compatible with the solvent include organic peroxides such as benzoyl peroxide, lauroyl peroxide, diisopropyl benzene peroxide, and methyl ethyl ketone peroxide; hydroperoxides such as hydrogen peroxide, cumene hydroperoxide, and diisopropylbenzene hydroperoxide; peresters such as tertbutyl perbenzoate; percarbonates such as dibutyl, bis(2-ethylhexyl) or diisopropyl peroxycarbonates which may be used in combination with a reducing agent such as sodium bisulfite or formaldehydesulfoxylate, polyethylene amines, sugars, and metal salts; and azoaliphatic initiators such as azobisisobutyronitrile, 2,2'-azobis(2,4-dimethylvaleronitrile), and 2,2'-azobis(2,4-dimethyl-4-methoxyvaleronitrile).

The quantity of initiator preferably employed depends on the nature of the monomer composition and on polymerization temperature and ranges from about 0.01 to 5% by weight relative to the monomer composition, and preferably from 0.5 to 3% by weight relative to the monomer composition.

Representative chain-transfer agents include mercaptans such as n-butyl, n-octyl, n-lauryl and tert-dodecyl mercaptans; and halogenated derivatives such as carbon tetrabromide or bromoform. The chain-transfer agents are employed in quantities of from 0 to approximately 3% by weight based on the monomer composition.

The polymerization operation preferably takes from about 1 to 24 hours depending on the nature of the monomer composition, the concentration and nature of the initiator and the polymerization temperature.

If desired, the polymers obtained can be separated from the solvent, for example, by solvent evaporation when the solvent is volatile, or by precipitation of the polymer with a liquid which is a non-solvent for the polymer, for example, a liquid such as short-chain alcohols, such as methanol, ethanol, or isopropanol or saturated hydrocarbons such as hexane, heptane, petroleum ether, or cyclohexane.

The present invention also relates to aqueous dispersions or latices of the crosslinkable polymers described above. The solids content of the dispersions (proportion of particles of crosslinkable polymer) preferably ranges from about 1 to 65% by weight, more preferably from 45 to 55% by weight. The dispersions or latices consist of particles of crosslinkable polymer, which have a diameter of from about 0.05 to 3μm, more preferably from 0.1 to 0.2 μm dispersed in water. Another preferred particle diameter is from 0.05 to 1.5 μm.

Aqueous dispersions can be obtained, for example, by emulsion polymerization of a monomer composition comprising:

about 1–100% of an unsaturated ester of furoic acid of formula I; and 0- about 99% of at least one of the above mentioned unsaturated monomers which are copolymerizable with the ester of formula I, in the presence of a water-soluble initiator and, if appropriate, an emulsifying agent.

The copolymer dispersion can be prepared, for example, from:

about 1 to 50% of an unsaturated ester of furoic acid of formula (I), and about 50 to 99% of at least one unsaturated monomer which is copolymerizable with the ester of formula (I).

The unsaturated ester of formula I and representative optional monomer(s) which can be employed are mentioned. The unsaturated ester and monomer(s) can be added to the reaction medium, either initially before polymerization begins, or in successive portions or continuously during the polymerization. The monomer composition need not be uniform in nature during the portionwise or continuous addition of the ester and monomer(s).

Representative water-soluble initiators include hydroperoxides such as hydrogen peroxide, cumene hydroperoxide or diisopropylbenzene hydroperoxide, and persulfates such as sodium persulfate, potassium persulfate and ammonium persulfate.

The quantity of water-soluble initiator preferably employed is from about 0.05 to 2% by weight based on the weight of the monomer composition. These initiators can be optionally used in combination with a reducing agent such as sodium bisulfite or formaldehydesulfoxylate, polyethylene amines or sugars such as dextrose or sucrose or metal salts. The quantity of reducing agent preferably used is from 0 to about 3% by weight based on the weight of the monomer composition.

Illustrative optional emulsifying agents include conventional anionic agents, preferably salts of fatty acids, alkali metal alkylsulfates, alkylsulfonates, arylsulfates, arylsulfonates, alkylarylsulfates, alkylarylsulfonates, sulfosuccinates and alkylphosphates, salts of hydrogenated or unhydrogenated abietic acid, nonionic agents such as polyethoxylated fatty alcohols, polyethoxylated alkylphenols, and polyethoxylated fatty acids. The emulsifying agents are preferably used in a proportion of 0.01 to about 5% by weight based o the weight of the monomer composition.

If appropriate, a chain-transfer agent can be preferably employed in proportions ranging from 0 to about 3% by weight based on the monomer composition. Illustrative chain-transfer agents include n-dodecyl mercaptan, tert-dodecyl mercaptan, cyclohexene, halogenated hydrocarbons such as chloroform, bromoform, carbon tetrachloride or carbon tetrabromide, and α-methylstyrene dimers.

The polymerization temperature, which depends on the nature of the monomer composition and the initiator employed, is preferably from about 0° to about 110° C., more preferably from 20° to 90° C.

Preferably, the polymerization process occurs in about from 1 to 24 hours, depending on the nature of the monomer composition, initiator and the temperature.

Although the aqueous dispersions obtained have a low glass transition temperature Tg, which generally lies below ambient temperature, the dispersions produce films having noteworthy surface hardness and tenacity, good flexibility at low termperatures and high insensitivity to water and solvents due to the spontaneous crosslinking of the polymer in the latex in the presence of atmospheric oxygen.

The particles of crosslinked polymers can be separated from the aqueous medium by any known means such as water evaporation, coagulation by the addition of alkali metal salts or by the addition of strong acids, low temperature coagulation, or precipitation of the crosslinkable polymer with a water-miscible liquid which is a non-solvent for the polymer, for example, short-chain alcohols or acetonitrile.

The crosslinkable polymers and the aqueous dispersions of crosslinkable polymers of the present invention crosslink spontaneously at normal temperatures and can be employed in an advantageous manner as raw materials for the manufacture of various coatings on paper, metals, wood, and plastics as well as in the manufacture of varnishes, adhesives and sealants, and as binders for pigments or for sheets of fibrous substances.

The following illustrative examples are not to be considered as limiting the scope and the spirit of the invention.

EXAMPLE 1

Preparation of a 2-ethylfuroate methacrylate homocolymer 50 g of toluene 50 g of 2-ethylfuroate methacrylate, and 1.5 g of azobisdimethylvaleronitrile (3% based on the monomer) are introduced into a jacketed 250 cc reactor fitted with an anchor stirrer.

The solution obtained is degassed with nitrogen for 30 min. The solution is kept under nitrogen and heated to 65° C. for $2\frac{1}{2}$ hours. A polymer salt in toluene is obtained in a yield of 99.2% which indicates that crosslinking has begun.

The polymer formed has a glass transition temperature $T_g$ of approximately 32° C.

The 2-ethylfuroate methacrylate employed in this example was prepared as follows:

455 g (3.5 moles) of ethylene glycol methacrylate and 387 g (4.9 moles) of anhydrous pyridine were introduced at a temperature of 25° C., under a stream of nitrogen in an anhydrous atmosphere, into a 2-liter reactor fitted with a jacket with circulating liquid coolant and an anchor stirrer.

503 g (3.85 moles) of furoyl chloride were added gently so as not to exceed a temperature of 15° C. The temperature was kept constant for one hour, and the reaction mixture was left to stand for 10 hours at ambient temperature.

The reaction mixture was poured into an aqueous solution containing 4.5 moles of hydrochloric acid and ice.

The organic phase consisting of the desired ester was separated off by liquid/liquid phase separation, and washed first with an aqueous solution containing 10% of sodium bicarbonate and second with water, to neutrality.

After filtration, a colorless viscous liquid was obtained.

EXAMPLES 2-17

By using the procedure described in Example 1, copolymers of 2-ethylfuroate methacrylate with styrene and/or butyl acrylate were prepared from:

toluene, as a solvent 2-ethylfuroate methacrylate (EFM)

styrene (S) and/or butyl acrylate (BuA) and azobisdimethylvaleronitrile as an initiator (3% by weight based on the monomers).

The reactant quantities employed, polymerization time, conversion, and the composition of the polymer obtained which were determined by proton NMR analysis are set forth in Table I.

EXAMPLE 18

The procedure described in Example 1 was used to prepare a copolymer of 2-ethylfuroate methacrylate with butyl acrylate, in a methacrylate/acrylate weight ratio of 55/45. The copolymer was prepared from:

50 g of toluene 12.5 g of 2-ethylfuroate methacrylate 12.5 g of butyl acrylate, and 0.75 g of azobisdimethylvaleronitrile as an initiator.

The copolymer obtained after polymerization for 2 hours, 30 min at 65° C. is completely soluble in toluene when it has not been exposed to air. The copolymer has the following properties:

proportion of methacrylate: 45% proportion of butyl acrylate: 55% glass transition temperature: $Tg = -7°$ C.; $\Delta Tg = 19°$ C.

Crosslinkability of the copolymer

Crosslinkability of the copolymer can be determined by measuring the degree of crosslinking by preferably using the method of solvent extraction of films which involves the concepts of gel content and swelling ratio.

The copolymer was dissolved in methylene chloride to produce a solution containing 10% of copolymer by weight.

A 30 μm film was prepared by means of a filmdrawer.

The extraction was carried out using dimethylformamide and from about 200 to 300 mg of dry film which was placed in the bottom of a paper thimble supported on a thimble-holder which was placed in the bottom of a 70 ml extraction vessel.

The extraction was performed as follows:

1. The thimble and the thimble-carrier were placed in an extraction vessel containing 35 ml of dimethylformamide.

The thimble and the thimble-carrier were removed after one half hour and placed for 1 hour in a desiccator saturated with dimethylformamide vapor, drained and weighed (weight $T_1$). The thimble and the thimble carrier were dried in an oven at 100° C., reweighed together and weight $T_2$ was obtained.

2. 200 to 300 mg of dry film were placed in the paper thimble, the thimble and thimble carrier were weighed together and weight $P_1$ was obtained.

The thimble and thimble carrier were placed in the extraction vessel containing 35 ml of dimethylformamide. The vessel was agitated for about 10 hours.

The thimble and thimble carrier were removed from the extraction vessel and placed in a desiccator saturated with dimethylformamide vapor for 1 hour, and weight $P_2$ was measured. After drying in an oven at 100° C., and weighing, weight $P_3$ was obtained.

The gel content. G.C., in %, was calculated using the formula:

$$G.C. \text{ in } \% = \frac{P_3 - T_2}{P_1 - T_2} \times 100$$

wherein $P_3 - T_2$ represents the dry mass of gel after the solvent has been removed, and $P_1 - T_2$ represents the mass of the test specimen (film).

The swelling index S.I. was calculated using the formula:

$$S.I. = \frac{P_2 - T_1}{P_3 - T_2}$$

where $P_2 - T_1$ represents the mass of solvent-swollen gel, and $P_3 - T_2$ represents the mass of dried gel.

These measurements were carried out for the following films (a) to (i):

(a) control film, not exposed to air
(b) film exposed to air for 24 hours at 25° C.
(c) film exposed to air for 14 days at 25° C.
(d) film exposed to air for 27 days at 25° C.
(e) film exposed to air for 2 hours at 100° C.
(f) film exposed to air for 7 h 30 min at 100° C.
(g) film prepared from a polymer to which 2% of benzoyl peroxide has been added and which has been maintained at 100° C. for 2 hours
(h) film prepared from a polymer to which 1% of methyl ethyl ketone peroxide and 0.4% of cobalt octoate have been added and which has been kept at 25° C. for 24 hours
(i) film prepared from a polymer to which 0.8% of cobalt octoate has been added and which has been kept at 25° C. for 24 hours.

The results of these measurements are shown in Table II.

EXAMPLE 19

Preparation of a 2-ethylfuroate Methacrylate Homopolymer Latex

The following are introduced into a 500 ml glass reactor fitted with an anchor stirrer:

200 parts deionized water
1 part sodium laurylsulfate
0.36 part potassium hydrogen phosphate
0.18 part sodium dihydrogen phosphate
1 part potassium persulfate
100 parts 2-ethylfuroate methacrylate.

The reaction mixture was purged with nitrogen and heated to 40° C. An aqueous solution of 0.5 part of sodium bisulfite was then added over 4 hours.

After 6 hours of reaction, the latex was cooled to ambient temperature.

The conversion was 99.5%.

The latex obtained has the following properties:
solids content: 33% mean particle diameter: 0.13μm
pH: 7.2
glass transition temperature of the polymer: Tg = 34° C.

The polymer obtained was only partially soluble in dimethylformamide or tetrahydrofuran; it was therefore partially crosslinked.

EXAMPLES 20–27

General method of preparation of latices of copolymers of an unsaturated ester of furoic acid.

The following were introduced into a 2-liter glass reactor fitted with an anchor stirrer:

89 parts water
0.1 part sodium alkylsulfonate and
0.5 part sodium vinylsulfonate.

The reaction mixture was purged with nitrogen and then heated to 80° C. The following were added in succession:

0.2 part ammonium persulfate
99.5 parts monomers, continuously over 5 hours, and
0.6 part ammonium persulfate dissolved in 7 parts of water, continuously over 7 hours.

After 8 hours of polymerization the latex was cooled to ambient temperature.

The following tests 20 to 27 were carried out:

20: Control test carried out in the absence of 2-ethylfuroate methacrylate, with continuous addition, over 5 hours, of a mixture of styrene (S), butyl acrylate (BuA) and acrylic acid (AA).

21: Test carried out with continuous addition of acrylic acid and styrene from 0 to 300 min and a continuous addition of 2-ethylfuroate methacrylate (EFM), continuously between 258 and 300 min.

22: Test carried out with continuous addition of acrylic acid and butyl acrylate from 0 to 300 min, continuous addition of styrene from 0 to 120 min and from 270 min to 300 min and continuous addition of EFM from 120 to 270 min.

23: Test carried out with continuous addition of styrene from 0 to 120 min and from 270 to 300 min, continuous addition of acrylic acid and butyl acrylate from 0 to 270 min and continuous addition of EFM from 120 to 270 min.

24: Test carried out with continuous addition of styrene, butyl acrylate and acrylic acid in a S/BuA/AA weight proportion of 45.7/50.3/4 from 0 to 240 min, and continuous addition of styrene, butyl acrylate, acrylic acid and 2-ethylfuroate methacrylate in a S/BuA/AA/EFM weight proportion of 20.6/50.3/4/25.1 from 240 to 300 min.

25: Test similar to test 24, with 2-ethylfuroate methacrylate replaced by the same quantity of isopropylfuroate acrylate (PFA).

26: Test carried out with continuous introduction of styrene, butyl acrylate and acrylic acid in a S/BuA/AA weight proportion of 45.7/50.3/4 from 0 to 180 min and continuous addition of styrene, butyl acrylate, acrylic acid and 2-ethylfuroate methacrylate in a S/BuA/AA/EFM weight proportion of 20.6/50.3/4/25.1 from 180 to 300 min.

27: Test similar to test 26, with 2-ethylfuroate methacrylate replaced by the same quantity of isopropylfuroate acrylate.

The monomer quantities employed and the properties of the latices obtained are shown in Tables III and III.

The isopropylfuroate acrylate employed in Examples 25 and 27 was prepared as follows:

The following were added at a temperature of 25° C., under a stream of nitrogen and in an anhydrous atmosphere to a 2-liter reactor fitted with a jacket with circulating liquid coolant, and an anchor stirrer:

455 g (3.5 moles) of propylene glycol acrylate consisting of approximately 80% by weight of 2-hydroxy-2-methylethyl acrylate and 20% by weight of 2-hydroxy-1-methylethyl acrylate, and 387 g (4.9 moles) of anhydrous pyridine.

Then 503 g (3.85 moles) of furoyl chloride were added gently so as not to exceed a temperature of 5° C. This temperature was maintained for another hour and then the reaction mixture was left to stand at ambient temperature for 10 hours.

The reaction mixture was then poured into an aqueous solution containing 4.5 moles of hydrochloric acid and ice.

The organic phase consisting of the desired ester was separated off by liquid/liquid phase separation, and washed first with an aqueous solution containing 10% of sodium bicarbonate and second with water, to neutrality.

After filtration, a colorless viscous liquid was obtained.

Crosslinkability of the Latices of Examples 20, 22 and 23

The gel contents G.C., in %, and the swelling indices S.I. were measured using the method described in Example 18.

The measurements were carried out for films prepared from the latices of Examples 20, 22 and 23 and which had been subjected to the following treatments k) to (p):

(k) film exposed to air for 24 h at 25° C.
(l) film exposed to air for 8 days at 25° C.
(m) film exposed to air for 1 h at 50° C.
(n) film exposed to air for 24 h at 50° C.
(o) film exposed to air for 1 h at 100° C.
(p) film exposed to air for 8 h at 100° C.

The results are shown in Table IV.

A determination of the surface crosslinking of the films prepared from the latices of Examples 20–27 may be carried out by measuring the Persoz hardness in accordance with the French Standard AFNOR T 30-016.

These measurements were carried out for films produced from the latices of Examples 20 to 27, which had been subjected to heat treatments (at 23° C., 50° or 100° C.) in air.

The treatment times and the results of the measurements are shown in Table V.

The degree of crosslinking of the films after treatment in air can also be estimated from their visco-elastic properties.

The measurement of elastic modulus was carried out with the use of the Rheometrix Ms 7200, for the latices of Examples 20 to 23. The measurement consists of placing a polymer film of thickness h between two discs of radius R′ whose axes are offset by a value "a" relative to each other.

Rotation at a speed W is applied to the upper plate, thus subjecting the film to a stress which is transmitted to the lower plate on which force sensors are placed. This stress can be resolved into two forces:

a force Fx which tends to return the axes to coalignment with each other and is proportional to the elastic modulus;

a force Fy which is perpendicular to Fx and proportional to the viscous modulus.

The elastic module G′ is given by the formula:

$$G' = Fx \cdot \frac{1}{\pi R^2} \cdot \frac{h}{a}$$

The measurement is carried out by fixing W at 0.4 rad/s and the ratio h/a at 40, at a temperature of 40° C. or 50° C.

Table VI shows the treatment to which the films of latices of Examples 20 to 23 were subjected before the measurement of elastic modulus, and the results of this measurement.

TABLE I

| EX. | % by weight in monomers | | | Monomers/ toluene in % | Time | Conversion in % | % by weight in copolymers | | |
|---|---|---|---|---|---|---|---|---|---|
| | EFM | S | BuA | | | | EFM | S | BuA |
| 2 | 50 | 50 | — | 25 | 1 h | 13.0 | 54 | 46 | — |
| 3 | 50 | 50 | — | 25 | 2 h | 25.2 | 55 | 45 | — |
| 4 | 50 | 50. | — | 25 | 4 h | 40.1 | 54 | 46 | — |
| 5 | 50 | 50 | — | 25 | 6 h | 49.6 | 55 | 45 | — |
| 6 | 50 | 50 | — | 25 | 8 h | 50.2 | 51 | 49 | — |
| 7 | 50 | — | 50 | 25 | 1 h | 28.6 | 66 | — | 34 |
| 8 | 50 | — | 50 | 25 | 2 h | 38.0 | 60 | — | 40 |
| 9 | 50 | — | 50 | 25 | 4 h | 51.6 | 57 | — | 43 |
| 10 | 50 | — | 50 | 25 | 6 h | 66.3 | 52 | — | 48 |
| 11 | 50 | — | 50 | 50 | 2 h | 62.8 | — | — | — |
| 12 | 50 | — | 50 | 50 | 2 h 30 | 66.7 | — | — | — |
| 13 | 50 | 25 | 25 | 25 | 1 h | 15.7 | 54 | 29 | 17 |
| 14 | 50 | 25 | 25 | 25 | 2 h | 27.9 | 53 | 31 | 16 |
| 15 | 50 | 25 | 25 | 25 | 4 h | 41.7 | 47 | 32 | 21 |
| 16 | 50 | 25 | 25 | 25 | 6 h | 49.4 | 49 | 31 | 20 |
| 17 | 50 | 25 | 25 | 25 | 9 h | 56.4 | 50 | 29 | 21 |

TABLE II

| Film | S.I. | G.C. in % |
|---|---|---|
| a | — | 0 |
| b | 284 | 1.5 |
| c | 57 | 21.2 |
| d | 36.8 | 46.0 |
| e | 28.7 | 59.3 |
| f | 25.1 | 70.3 |
| g | 17.4 | 94.1 |
| h | 20.0 | 77.1 |
| i | 77 | 3.2 |

TABLE III

| Example | % in monomers BuA | S | AA | EFM | Conversion in % | S.C. % | pH | ⌀ μm | Tg |
|---|---|---|---|---|---|---|---|---|---|
| 20 | 50.0 | 45.5 | 4.0 | — | 99.6 | 51.6 | 2.3 | 0.116 | +18 |
| 21 | 50.0 | 41.5 | 4.0 | 4.0 | 99.5 | 51.0 | 2.3 | 0.125 | +11 |
| 22 | 45.5 | 25.0 | 4.0 | 25.0 | 98.9 | 50.1 | 1.8 | 0.113 | +14 |
| 23 | 45.5 | 25.0 | 4.0 | 25.0 | 98.6 | 50.6 | 1.7 | 0.112 | +14 |

S.C. denotes solids content.
⌀ denotes mean particle diameter.

TABLE III'

| Example | % in monomers BuA | S | AA | EFM | PFA | Conversion | S.C. % | pH | ⌀ μm | Tg |
|---|---|---|---|---|---|---|---|---|---|---|
| 24 | 50 | 40.5 | 4 | 5 | — | 98.8 | 48 | 2.1 | 0.11 | +9° |
| 25 | 50 | 40.5 | 4 | — | 5 | 99.4 | 49 | 2.1 | 0.115 | +10° |
| 26 | 50 | 35.5 | 4 | — | 10 | 98.8 | 49.9 | 2 | 0.109 | +6° |
| 27 | 50 | 35.5 | 4 | 10 | — | 97.8 | 50.1 | 2 | 0.111 | +6° |

S.C. denotes solids content.
⌀ denotes mean particle diameter.

TABLE IV

| Film Treatment | | Example 20 GC % | SI | Example 22 GC % | SI | Example 23 GC % | SI |
|---|---|---|---|---|---|---|---|
| 25° C. | 24 h | 0 | 0 | 61.9 | 8.7 | 60.9 | 7.0 |
|  | 8 Days | 0 | 0 | 97.8 | 5.8 | 85.8 | 6.4 |
| 50° C. | 1 h | 0 | 0 | 63.8 | 9.3 | 63.6 | 9.0 |
|  | 24 h | 0 | 0 | 77.8 | 6.3 | 69.6 | 7.6 |
| 100° C. | 1 h | 0 | 0 | 76.2 | 6.2 | 71.4 | 6.3 |
|  | 8 h | 0 | 0 | 82.4 | 6.0 | 79.3 | 5.1 |

TABLE V

| Treatment T° C. | Time | PERSOZ hardness, in s, for the latices of examples | | | | | | | |
|---|---|---|---|---|---|---|---|---|---|
| | | 20 | 21 | 22 | 23 | 24 | 25 | 26 | 27 |
| 23° C. | 6 h | 120 | 83 | — | — | — | — | — | — |
|  | 24 h | 126 | 91 | 89 | 57 | 78 | 47 | 56 |  |
|  | 48 h | 126 | 98 | — | — | 70 | 90 | 65 | 71 |
|  | 72 h | 127 | 105 | — | — | 85 | 109 | 82 | 90 |
|  | 7 d | — | — | — | — | 125 | 130 | 97 | 111 |
|  | 10 d | 127 | 120 | 122 | 118 | — | — | — | — |
|  | 20 d | 127 | 127 | — | — | — | — | — | — |
|  | 35 d | 127 | 132 | — | — | — | — | — | — |
|  | 47 d | 127 | 138 | 142 | 130 | — | — | — | — |
|  | 2 months | 126 | 142 | 143 | 130 | — | — | — | — |
|  | 4 months | 120 | 152 | — | — | — | — | — | — |
| 50° C. | 1 h | 120 | 85 | — | — | 60 | 81 | 50 | 60 |
|  | 2 h | 126 | — | — | — | 76 | 91 | 76 | 70 |
|  | 6 h | 127 | 112 | — | — | — | — | — | — |
|  | 8 h | 129 | — | — | — | 107 | 106 | 107 | 127 |
|  | 24 h | 130 | 127 | — | — | 126 | 117 | 126 | 144 |
|  | 48 h | 131 | — | — | — | 134 | 127 | 136 | 155 |
|  | 72 h | 133 | — | — | — | 137 | 130 | 141 | 157 |
| 100° C. | 1 h | 125 | — | — | — | 110 | 115 | 100 | 136 |
|  | 2 h | 130 | — | — | — | 120 | 124 | 116 | 145 |
|  | 8 h | 130 | — | — | — | 128 | 129 | 123 | 150 |
|  | 24 h | 131 | — | — | — | 130 | 137 | 132 | 165 |
|  | 48 h | 133 | — | — | — | 148 | 140 | 146 | 166 |
|  | 72 h | 135 | — | — | — | 151 | 148 | 151 | 173 |

TABLE VI

| Treatment of the film to be tested T° C. | Time | T° C. of the measurement | Modulus G', in N/m², for the latices of examples | | | |
|---|---|---|---|---|---|---|
| | | | 20 | 21 | 22 | 23 |
| 23° C. | 24 h | 40° C. | 16 000 | 14 400 | 16 800 | 16 000 |
|  | 48 h |  | 15 800 | 16 300 | — | — |
|  | 10 d |  | — | — | 20 000 | 24 000 |
|  | 35 d |  | 15 400 | 18 700 | — | — |
| 50° C. | 1 h 30 | 50° C. | 14 200 | 16 800 | 22 400 | 18 000 |
|  | 24 h |  | 13 600 | 19 200 | — | — |
|  | 72 h |  | 13 200 | 20 000 | 28 000 | 24 000 |
| 50° C. | 3 h 30 | 40° C. | 17 200 | — | 24 000 | 20 000 |
|  | 12 h |  | — | — | 25 000 | 29 600 |
|  | 14 h |  | 16 800 | — | 32 000 | 34 000 |

We claim:

1. A crosslinkable polymer comprising:
    about 1 to 100% of units derived from an unsaturated ester of furoic acid, of the formula (I):

$$CH_2=C(R)-C(=O)-O-(R')_n-O-C(=O)-\text{furyl} \quad (I)$$

wherein
    R denotes hydrogen or a $C_1$-$C_2$ alkyl group;
    R' denotes a straight-chain or branched $C_1$-$C_5$ alkylene group;
    n denotes an integer from 1 to 4; and
    0 to about 99% of units derived from at least one unsaturated monomer which is copolymerizable with the unsaturated ester of formula I.

2. The crosslinkable polymer of claim 1, comprising: about 1 to about 50% of units derived from said unsaturated ester of furoic acid of formula (I) and from about 50 to about 99% of units derived from at least one unsaturated monomer which is copolymerizable with the unsaturated ester of formula (I).

3. The crosslinkable polymer of claim 1, wherein R denotes a $C_1$ alkyl group.

4. The crosslinkable polymer of claim 1, wherein R' denotes a straight-chain or branched $C_2$-$C_4$ alkylene group.

5. The crosslinkable polymer of claim 1, wherein n is 1.

6. The crosslinkable polymer of claim 1, wherein the unsaturated ester of furoic acid is 2-ethylfuroate acrylate or methacrylate, or isopropylfuroate acrylate or methacrylate.

7. The crosslinkable polymer of claim 1, wherein the monomer is a conjugated diene, an acrylic or methacrylic monomer, a vinyl aromatic monomer, a mono- or dicarboxylic acid containing at least one ethylenic unsaturation, a vinyl or vinylidene halide, a vinyl ester of a carboxylic acid or an alkali metal salt of an alkali metal salt of an unsaturated sulfonic acid.

8. The crosslinkable polymer of claim 7, wherein the monomer is butadiene, butyl acrylate, styrene or acrylic acid.

9. The crosslinkable polymer of claim 8, wherein the unsaturated ester of furoic acid is 2-ethylfuroate acrylate or methacrylate, or isopropylfuroate acrylate or methacrylate.

10. An aqueous dispersion of crosslinkable polymers comprising from about 1 to 65% by weight, based on the weight of the aqueous dispersion, of solid particles of the crosslinkable polymer of claim 1.

11. The aqueous dispersion of claim 10, wherein the solids content is from about 45 to 55% by weight, based on the weight of said aqueous dispersion.

12. The aqueous dispersion of claim 11, wherein the particles of crosslinkable polymers have a diameter of about 0.05–1.5 $\mu$m.

13. The aqueous dispersion of claim 10, wherein the particles of crosslinkable polymers have a diameter of about 0.05–1.5 $\mu$m.

14. The aqueous dispersion of crosslinkable polymers of claim 12, wherein the particles of crosslinkable polymers have a diameter of about 0.1–0.2$\mu$m.

15. The aqueous dispersion of claim 13, wherein the particles of crosslinkable polymers have a diameter of about 0.1–0.2 $\mu$m.

16. A process for the preparation of particles of the crosslinkable polymer of claim 1 comprising the step of polymerizing a monomer composition comprising:
   about 1 to 100% of the unsaturated ester of furoic acid of formula I, and
   0 to about 99% of at least one of the nonhydrolyzable unsaturated monomers which are copolymerizable with the ester of formula I in aqueous emulsion in the presence of a water-soluble initiator for a time sufficient to form said crosslinkable polymer particles.

17. The process of claim 16 further comprising conducting the polymerizing step in the presence of an emulsifier and then isolating the particles of crosslinkable polymers from the reaction medium.

18. The process of claim 16, wherein the quantity of initiator is from about 0.05 to 2% by weight, based on the weight of the monomer composition.

19. The process of claim 17, wherein the quantity of emulsifier is from about 0.01 to 5% by weight, based on the monomer composition.

20. The process of claim 16, wherein the polymerization step is carried out at a temperature of from about 0° to 110° C.

21. The process of claim 20, wherein said temperature ranges from 20° to 90° C.

* * * * *